(No Model.)
H. H. HEWITT.
JOURNAL BEARING.
No. 306,921. Patented Oct. 21, 1884.
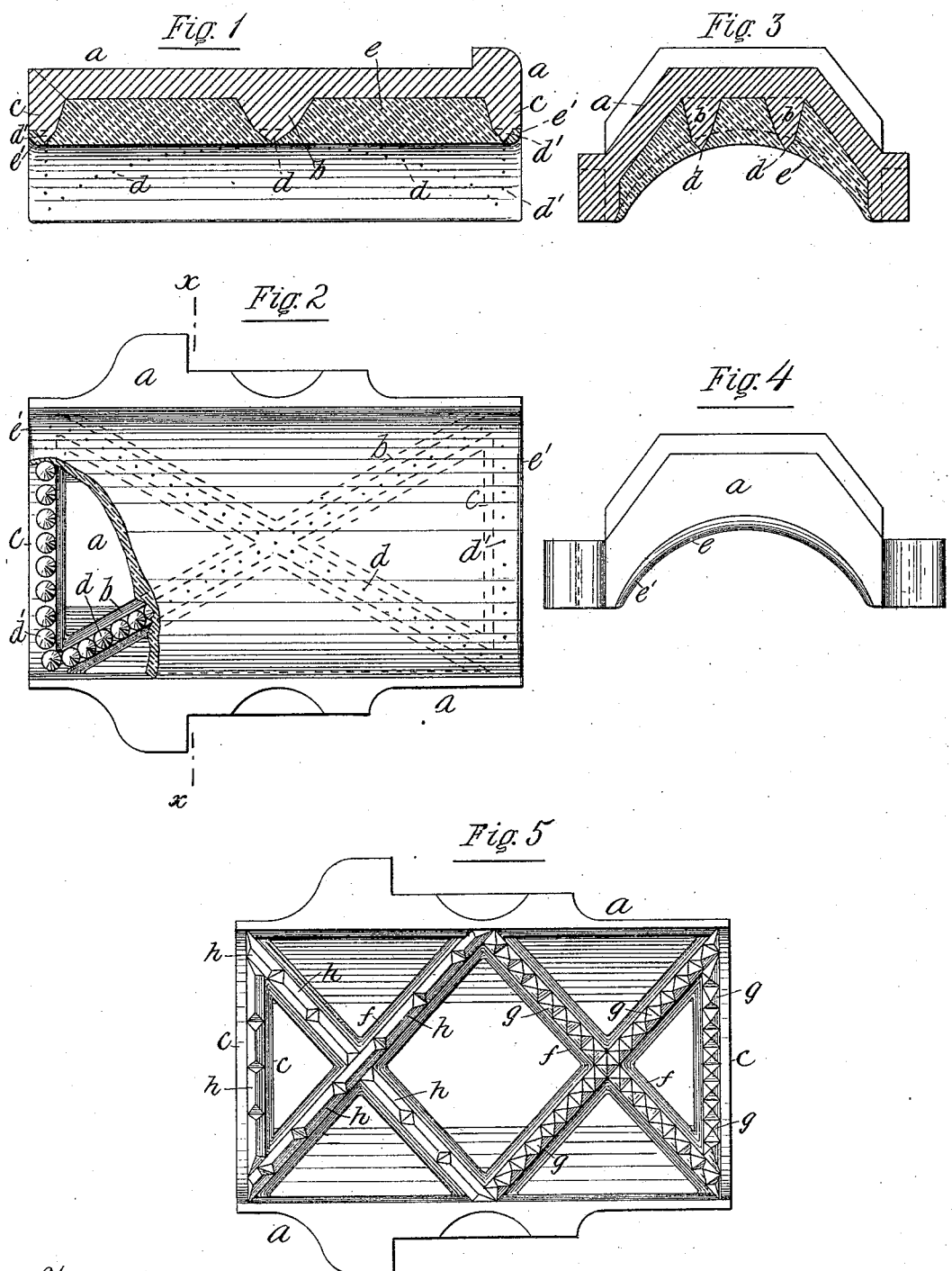

UNITED STATES PATENT OFFICE.

HERBERT H. HEWITT, OF NEW YORK, N. Y.

JOURNAL-BEARING.

SPECIFICATION forming part of Letters Patent No. 306,921, dated October 21, 1884.

Application filed September 17, 1884. (No model.)

*To all whom it may concern:*

Be it known that I, HERBERT H. HEWITT, a citizen of the United States, residing at New York, county and State of New York, have invented certain new and useful Improvements in Journal-Bearings, of which the following is a specification.

This invention relates to that class of journal-bearings composed of a hard metal shell and a soft metal filling, and known as "filled" or "shell" bearings. The hard-metal shells of such bearings are usually provided with internal ribs of various forms, which extend up through the soft metal and bear on the journal, and they are not self-fitting under the initial pressure and friction due to the load and rotation of the journal, as the ribs are made so broad as to retain their form under such circumstances, for which reasons this class of journal-bearings, when first applied to the journals, are liable to become sufficiently heated to cause the soft metal to flow out of the shells. The principal advantage of this class of bearings over solid hard-metal journal-bearings is that of cheapness, as the soft metal is much less expensive than the hard metal which it displaces.

Now, the object of this invention is to so construct journal-bearings that, while the advantage of cheapness pertaining to the shell or filled class of bearings is retained, they shall also possess the property essential to a perfect bearing of self fitting or adjustment on the journal when first applied thereto, by which excessive or dangerous heating of the same is avoided. To accomplish this desirable result, I make the ribs and end flanges of the hard-metal shell lower than has heretofore been the practice, so that they do not extend to the surface of the soft-metal filling; but I provide the surfaces of such ribs or flanges with taper projections integral therewith, with their points or sharp edges about even with the bearing-surface of the soft metal, which entirely surrounds them. This principle of taper projections of hard metal extending from the body of the bearing and surrounded by a soft metal is covered by United States Letters Patent No. 299,221, granted to me on May 24, 1884. And in this application of it to shell-bearings all the advantages of such construction, as set forth in said Letters Patent, are added to that due to shell-bearings, with the further gain that I am enabled to materially add to the strength of the shell by continuing the internal ribs out to the sides or corners of the shell without incurring any trouble in filling the shell with the soft metal, for the spaces between the taper projections on the ribs and end flanges permit of the ready flowing of the soft metal into all the chambers formed by such continued ribs from one place of pouring said soft metal, as hereinafter described.

In bearings made according to this invention the only parts of the hard-metal shell in contact with the journal when first applied are the points or sharp edges of the projections on the ribs and end flanges, which extend to the surface of the soft-metal filling, and which, while preventing the excessive displacement of the soft metal, yield to the load and friction sufficiently to allow the journal to bed itself into the soft metal, and have a uniform contact-bearing even when a new shell-bearing of this construction is applied to an old axle whose journal-surfaces are irregular by being worn into ridges. And, further, the property peculiar to my previous invention, as embraced in the before-mentioned Letters Patent, of a gradual change from a soft to a hard metal bearing-surface as the bearing wears away is retained in this invention in so far as the ribs and end flanges are concerned, the soft metal in the chambers formed by the internal ribs constituting the bearing material in such parts of the bearing until the same becomes so worn as to be unfit for further use.

In the accompanying drawings, forming part of this specification, Figure 1 is a longitudinal central section of the completed bearing. Fig. 2 is an underneath plan view showing surface with the soft-metal filling partly broken away. Fig. 3 is a transverse section on the line *x x*. Fig. 4 is an end elevation, and Fig. 5 is a view of the hard-metal shell, showing modifications in the ribs and taper projections.

The shell *a* is of the usual form as regards its exterior. The walls are, as shown, made as uniform in thickness as is compatible with the form of the bearing. Arranged diagonally in the shell $a$ are the ribs $b\ b$, which cross and join in the center of the bearing and connect at their ends to the corners formed by the side walls and end flanges, $c\ c$. These ribs $b\ b$ and end flanges, $c\ c$, are taper in form to permit of the proper molding of the shell, and they do not extend to the initial bearing-surface of the bearing, but are provided at their upper faces with a series of conical projections, $d\ d'$, integral therewith. The conical projections $d'$ on the end flanges, $c\ c$, are so placed that the soft-metal lining $e$, when poured in the shell, extends to the ends of the shell, so as to form soft-metal end bearings, $e'\ e'$, against the fillets of the journal. By continuing the ribs, which need not necessarily be of the form shown, so as to join the walls of the shell $a$, said shell is made very stiff and strong, using in its construction a minimum amount of metal, and as these ribs do not extend to the bearing-surface no obstruction is opposed to the proper flowing of the soft-metal lining $e$ into all parts of the shell. The filling of the shell is accomplished by first preparing the inside of the shell with the ribs and taper projections, so that the soft metal will adhere firmly thereto, then placing it against a core corresponding in shape and size to the journal with which the bearing is to be used, with the points of the taper projections of the shell only in contact with the cylindrical part of the core. The soft metal is then poured into the shell at one end thereof, the spaces between the taper projections affording sufficient passages for the soft metal to flow through and fill all parts of the shell and surround the said taper projections, and also form the edge bearings, $e'\ e'$, which come in contact with the fillets of the journals.

In the modifications shown in Fig. 5 two sets of diagonal ribs, $f\ f$, connect the walls of the shell $a$, instead of one set, as shown in the other views, and it is evident that the ribs $b\ b$ or $f\ f$ and end flanges, $c\ c$, may be provided with taper projections of any of the forms described in the before-mentioned Letters Patent, having points or sharp edges for the object set forth, and in this view are shown a series of pyramids, $g\ g$, on one half of the shell, and on the other half a series of elongated sharp-edged ridges, $h\ h$. The said taper projections, whatever their form, so interlock with the soft metal, whose bearing-surface, when first made, is one continuous surface of soft metal, with the exception of the places where the points or sharp edges of the projections are, that the lateral and longitudinal displacement of said soft metal by the pressure and friction of the journal is practically prevented, and as these taper projections wear away they cause a gradual transition from a bearing-surface, consisting of soft metal and points or lines of hard metal, or a surface of soft metal and minimum of hard metal, to one of soft metal, and the maximum of hard metal. It is evident that the ribs may have one continuous taper from their bases to their sharp edges.

What is here meant by "soft" in contradistinction to "hard" metal is a metal or alloy lining whose melting-point is below that of the hard-metal shell.

What I claim, and desire to secure by Letters Patent, is—

1. In a shell-bearing, a hard-metal shell having internal ribs provided with taper projections, in combination with a soft-metal filling surrounding or covering the same, substantially as and for the purpose set forth.

2. In a self-fitting shell-bearing, a hard-metal shell having end flanges and internal ribs, and taper projections on the end flanges integral therewith, in combination with a filling of soft metal which extends above the ribs and end flanges and surrounds the taper projections, substantially as and for the purpose set forth.

3. In a self-fitting shell-bearing, a hard-metal shell having end flanges, and internal ribs connecting the corners of the shell, said flanges and ribs being provided with taper projections, in combination with a soft metal, filling the hard-metal shell and surrounding the said taper projections, substantially as and for the purpose set forth.

4. In a shell-bearing, a hard-metal shell having end flanges provided with taper projections integral therewith, in combination with a soft-metal filling covering the same and forming soft-metal end bearings for the fillets of the journal, substantially as and for the purpose set forth.

5. The combination, in a self-fitting shell-bearing, of a hard-metal part composed of the shell $a$, ribs $b\ b$, end flanges, $c\ c$, and taper projections $d\ d'$, with a soft-metal filling, $e\ e'$, substantially as set forth.

6. In a shell-bearing, in combination, a hard-metal shell and soft-metal filling, said shell having internal ribs projecting to the surface of the soft-metal filling in points or sharp edges, substantially as and for the purpose set forth.

In testimony whereof I have hereunto set my hand at New York, county and State of New York, this 16th day of September, 1884.

HERBERT H. HEWITT.

Witnesses:
ALFRED SHEDLOCK,
H. D. WILLIAMS.